(12) United States Patent
Tsai

(10) Patent No.: US 9,019,617 B2
(45) Date of Patent: Apr. 28, 2015

(54) PLASTIC LENS

(71) Applicant: Largan Precision Co., Ltd., Taichung (TW)

(72) Inventor: Tsung-Hsien Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 90 days.

(21) Appl. No.: 13/938,250

(22) Filed: Jul. 10, 2013

(65) Prior Publication Data

US 2014/0347738 A1 Nov. 27, 2014

(30) Foreign Application Priority Data

May 27, 2013 (TW) .............................. 102118658 A

(51) Int. Cl.
*G02B 3/00* (2006.01)
*G02B 13/00* (2006.01)
*G02B 27/00* (2006.01)

(52) U.S. Cl.
CPC ........ *G02B 13/0015* (2013.01); *G02B 27/0018* (2013.01)

(58) Field of Classification Search
USPC .......................................................... 359/642
See application file for complete search history.

(56) References Cited

U.S. PATENT DOCUMENTS

| 6,073,851 A | 6/2000 | Olmstead et al. |
| 2007/0279911 A1 | 12/2007 | Kittelmann et al. |
| 2012/0140336 A1* | 6/2012 | Fujino et al. ................. 359/654 |

FOREIGN PATENT DOCUMENTS

| JP | 2009-204752 A | 9/2009 |
| TW | 201305595 A | 2/2013 |

* cited by examiner

*Primary Examiner* — James Jones
(74) *Attorney, Agent, or Firm* — CKC & Partners Co., Ltd.

(57) ABSTRACT

A plastic lens includes a first surface and a second surface. The second surface is opposite to the first surface. At least one of the first surface and the second surface includes an optically effective portion and an outer portion. The outer portion surrounds the optically effective portion. The outer portion includes a rugged region and an abutting region. The rugged region has a plurality of protrusions thereon. The abutting region is disposed farther from a center of the plastic lens than the rugged region.

22 Claims, 14 Drawing Sheets

PLASTIC LENS

RELATED APPLICATIONS

This application claims priority to Taiwan Application Serial Number 102118658, filed May 27, 2013, which is herein incorporated by reference.

BACKGROUND

1. Technical Field

The present disclosure relates to a plastic lens. More particularly, the present disclosure relates to a plastic lens with protrusions.

2. Description of Related Art

Due to the popularity of personal electronic products and mobile communication products having camera functionalities, such as smart phones and tablet personal computers, the demand for a compact optical system has been increasing. The compact optical systems have gradually evolved toward the field of higher megapixels, and have to satisfy the requirements of lightweight and high image quality. Plastic lenses with low specific gravity are favorable for manufacturing and shaping, so that the plastic lenses gradually replace glass lenses in the compact optical system. A plastic lens conventionally includes an optically effective portion and an outer portion, wherein the outer portion surrounds the optically effective portion. For simplifying the design of the plastic lens, the outer portion is usually formed in a simple surface structure to reduce unexpected light.

When the plastic lens is miniaturized for applying to the compact optical system, the weight of the compact optical system can be reduced effectively, but the unexpected light cannot be suppressed sufficiently. As a result, the image quality is poor and thereby cannot satisfy the requirements of high-end optical systems with camera functionalities.

SUMMARY

According to one aspect of the present disclosure, a plastic lens includes a first surface and a second surface. The second surface is opposite to the first surface. At least one of the first surface and the second surface includes an optically effective portion and an outer portion. The outer portion surrounds the optically effective portion. The outer portion includes a rugged region and an abutting region. The rugged region has a plurality of protrusions thereon. The abutting region is disposed farther from a center of the plastic lens than the rugged region. When a central thickness of the plastic lens is CT, and an outermost diameter of the plastic lens is Dmax, the following relationship is satisfied:

CT/max<0.2.

According to another aspect of the present disclosure, a plastic lens includes a first surface and a second surface. The second surface is opposite to the first surface. At least one of the first surface and the second surface includes an optically effective portion and an outer portion. The outer portion surrounds the optically effective portion. The outer portion includes a rugged region and an abutting region. The rugged region has a plurality of protrusions thereon. The abutting region is disposed farther from a center of the plastic lens than the rugged region. When a radial length of the rugged region is L, and a central thickness of the plastic lens is CT, the following relationship is satisfied:

0.5<L/CT<4.0.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
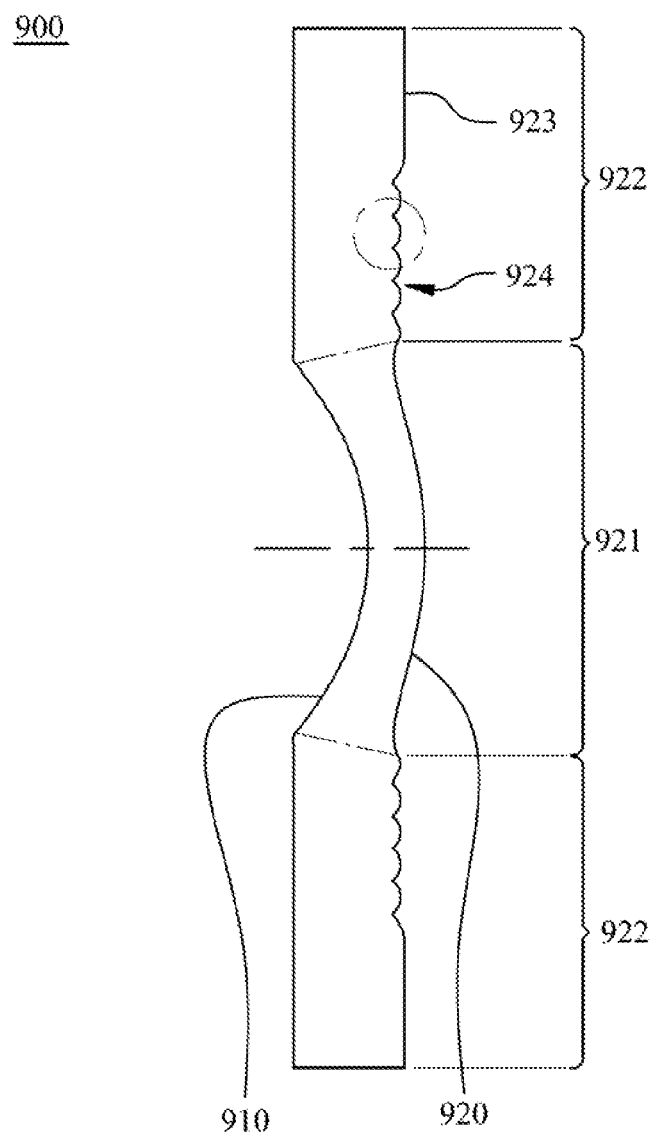
FIG. 1A is a schematic view of a plastic lens according to one embodiment of the present disclosure.
Figure 1B:
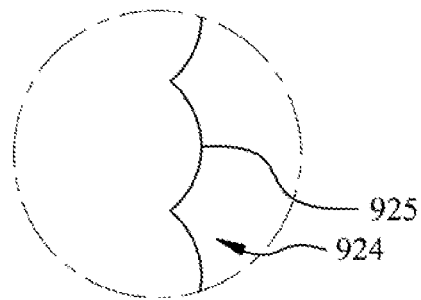
FIG. 1B is a partially enlarged view of a rugged region of the plastic lens shown in FIG. 1A.
Figure 1C:
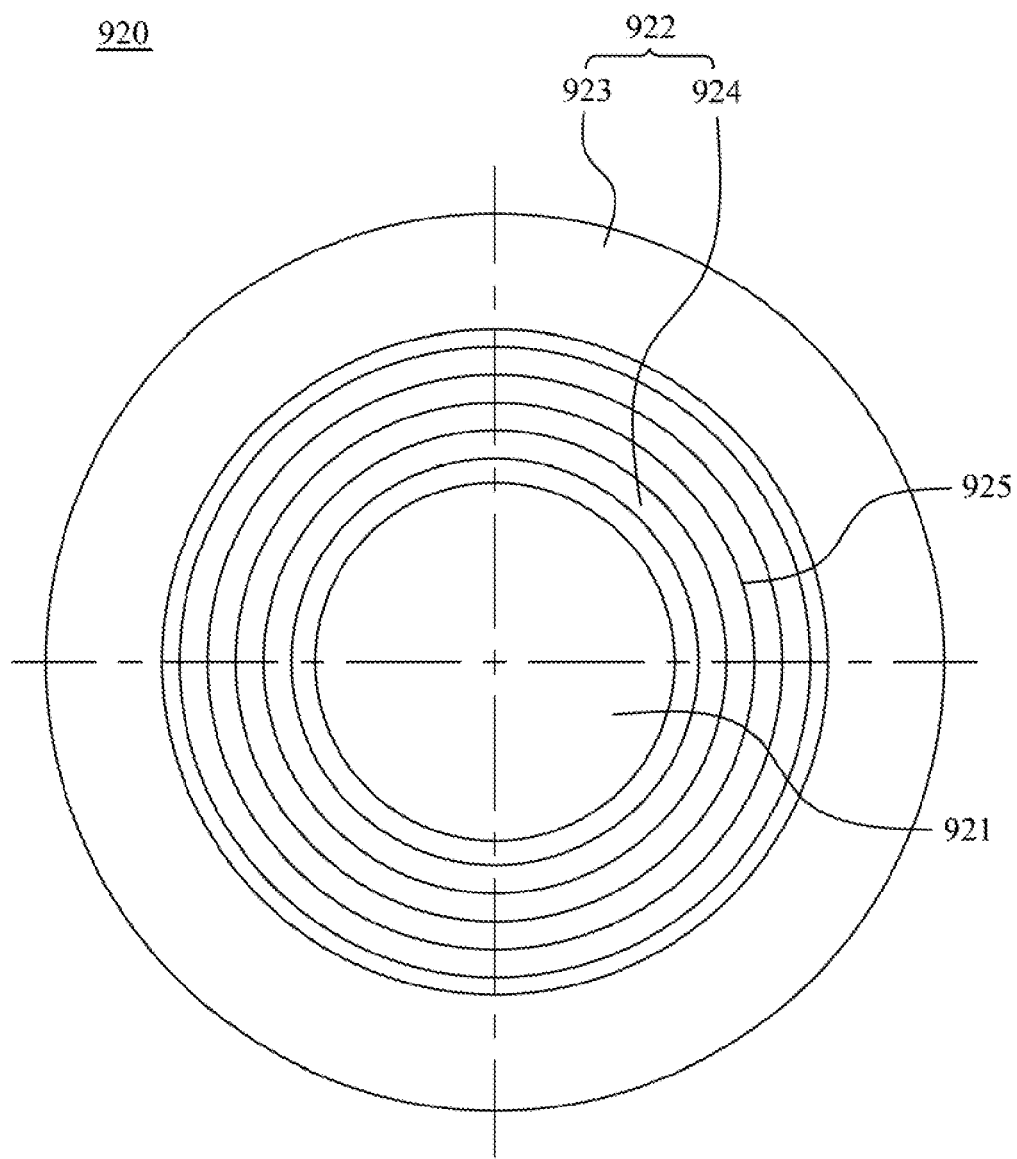
FIG. 1C is a schematic view of a second surface of the plastic lens shown in FIG. 1A.

FIG. 1A is a schematic view of a plastic lens 900 according to one embodiment of the present disclosure. FIG. 1B is a partially enlarged view of a rugged region 924 of the plastic lens 900 shown in FIG. 1A. FIG. 1C is a schematic view of a second surface 920 of the plastic lens 900 shown in FIG. 1A. In FIG. 1A, the plastic lens 900 includes a first surface 910 and the second surface 920. The second surface 920 is opposite to the first surface 910. At least one of the first surface 910 and the second surface 920 includes an optically effective portion 921 and an outer portion 922. In the embodiment, the second surface 920 includes the optically effective portion 921 and the outer portion 922. The outer portion 922 surrounds the optically effective portion 921. The outer portion 922 includes the rugged region 924 and an abutting region 923. The abutting region 923 is disposed farther from a center of the plastic lens 900 than the rugged region 924. As shown in FIG. 1B the rugged region 924 has a plurality of protrusions 925 thereon. Preferably, the protrusions 925 have the same size and shape. Therefore, the unexpected light can be suppressed by the protrusions 925 so as to enhance the image quality. The abutting region 923 is for abutting or engaging with other lenses or optical elements.

As shown in FIG. 1C, the protrusions 925 of the rugged region 924 can be annular, and the protrusions 925 can be disposed concentrically around the center of the plastic lens 900. Therefore, the unexpected light can be suppressed more effectively so as to enhance the image quality.

Figure 1D:
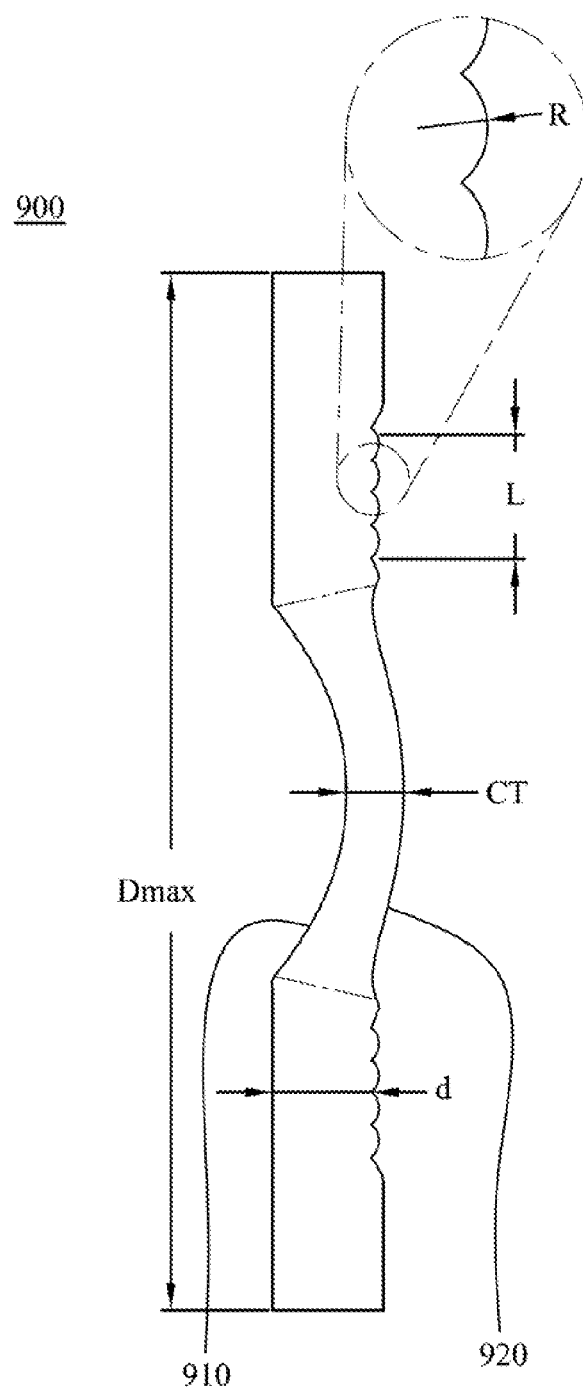
FIG. 1D is a schematic view showing parameters of the plastic lens shown in FIG. 1A.

FIG. 1D is a schematic view showing parameters of the plastic lens 900 shown in FIG. 1A. An outermost diameter of the plastic lens 900 is Dmax. A central thickness of the plastic lens 900 is CT. A radial length of the rugged region 924 is L. A minimum distance between the first surface 910 and the second surface 920 at the outer portion 922 is d. When the protrusions 925 are arc-shaped, a curvature radius of the protrusion 925 is R.

When the central thickness of the plastic lens 900 is CT, and the outermost diameter of the plastic lens 900 is Dmax, the following relationship is satisfied: $CT/Dmax<0.2$. Therefore, the dimensions of the plastic lens 900 are proper for allowing the protrusions 925 to suppress the unexpected light more effectively, and the optical quality of the plastic lens 900 can be enhanced.

When the outermost diameter of the plastic lens 900 is Dmax, the following relationship is satisfied: $Dmax<8$ mm. Therefore, the protrusions 925 can suppress the unexpected light more effectively, and the plastic lens 900 can be favorably applied to a compact optical system.

When the central thickness of the plastic lens 900 is CT, the following relationship is satisfied: $CT<0.35$ mm. Therefore, the plastic lens 900 can be favorably applied to a compact optical system. Preferably, the following relationship is satisfied: $CT<0.27$ mm.

When the radial length of the rugged region 924 is L, and the central thickness of the plastic lens 900 is CT, the following relationship is satisfied: $0.5<L/CT<4.0$. Therefore, the protrusions 925 can be properly arranged according to the dimensions of the plastic lens 900, so that the manufacturing difficulty can be reduced. Preferably, the following relationship is satisfied: $1.3<L/CT<2.3$.

The abutting region 923 of the outer portion 922 can be an engaging structure. Therefore, the abutting region 923 can engage with other lenses or optical elements so as to increase the applications of the plastic lens 900.

When the minimum distance between the first surface 910 and the second surface 920 at the outer portion 922 is d, and the central thickness of the plastic lens 900 is CT, the following relationship is satisfied: $d/CT<1.0$. Therefore, the protrusions 925 can be properly arranged according to the dimensions of the plastic lens 900, so that the manufacturing difficulty can be reduced.

When the radial length of the rugged region 924 is L, and the min mum distance between the first surface 910 and the second surface 920 at the outer portion 922 is d, the following relationship is satisfied: $0.7<L/d<4.0$. Therefore, the protrusions 925 can be properly arranged according to the dimensions of the plastic lens 900.

One of the first surface 910 and the second surface 920 of the plastic lens 900 can be concave, and the other can be convex, i.e. the plastic lens 900 is a meniscus lens. Therefore, the unexpected light can be suppressed and the astigmatism can be corrected at the same time.

When the protrusions 925 of the rugged region 924 are arc-shaped and the curvature radius of the protrusion 925 is R, the following relationship is satisfied: $0.01$ mm$<R<0.21$ mm. Therefore, the unexpected light can be suppressed more effectively so as to enhance the image quality. Preferably, the following relationship is satisfied: $0.03$ mm$<R<0.1$ mm.

When the protrusions 925 of the rugged region 924 are arc-shaped, the curvature radius of the protrusion 925 is R and the radial length of the rugged region 924 is L, the following relationship is satisfied: $0.03<R/L<0.3$. Therefore, the distribution of the protrusions 925 is proper so as to enhance the image quality, and the manufacturing difficulty of the plastic lens 900 can be reduced.

Figure 1E:
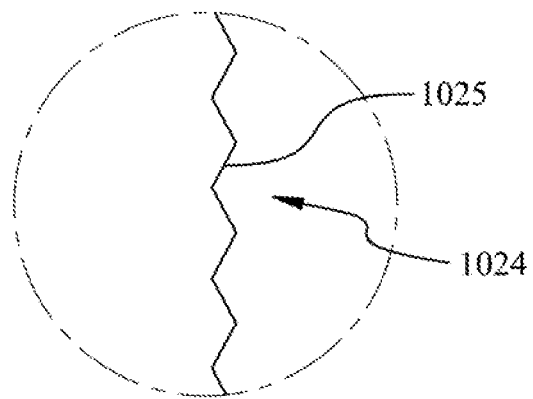
FIG. 1E is a partially enlarged view of a rugged region of a plastic lens according to another embodiment of the present disclosure.
Figure 1F:
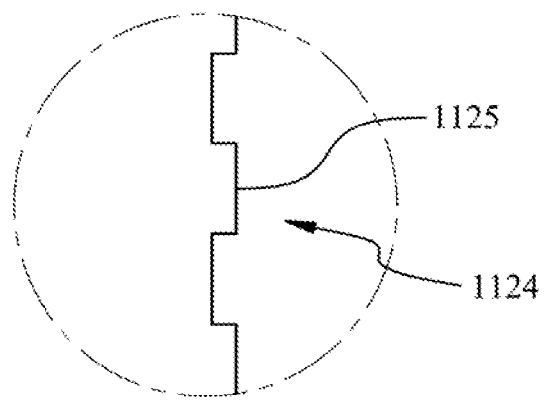
FIG. 1F is a partially enlarged view of a rugged region of a plastic lens according to another embodiment of the present disclosure.
Figure 1G:
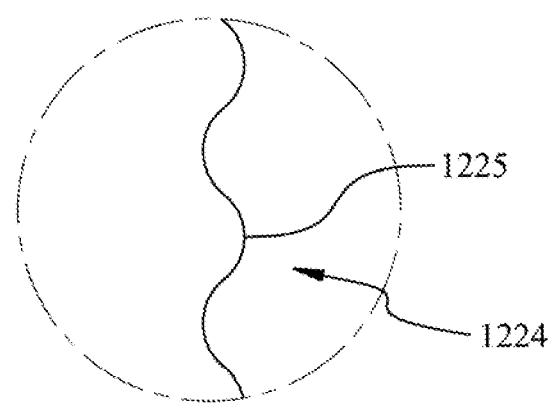
FIG. 1G is a partially enlarged view of a rugged region of a plastic lens according to another embodiment of the present disclosure.

Please refer to FIG. 1B, FIG. 1E, FIG. 1F, and FIG. 1G. FIG. 1E is a partially enlarged view of a rugged region 1024 of a plastic lens according to another embodiment of the present disclosure. FIG. 1F is a partially enlarged view of a rugged region 1124 of a plastic lens according to another embodiment of the present disclosure. FIG. 1G is a partially enlarged view of a rugged region 1224 of a plastic lens according to another embodiment of the present disclosure. In FIG. 1B, the protrusions 925 are arc-shaped. In FIG. 1E, the protrusions 1025 are triangular. In FIG. 1F, the protrusions 1125 are rectangular. In FIG. 1G, the protrusions 1225 are arc-shaped, wherein the arrangement of the protrusions 1225 is different with the arrangement of the protrusions 925 shown in FIG. 1B. Therefore, the shape and arrangement of the protrusions can be adjusted flexibly for various applications of the plastic lens.

According to the above description of the present disclosure, the following 1st-7th specific examples are provided for further explanation.

1st Example

Figure 2A:
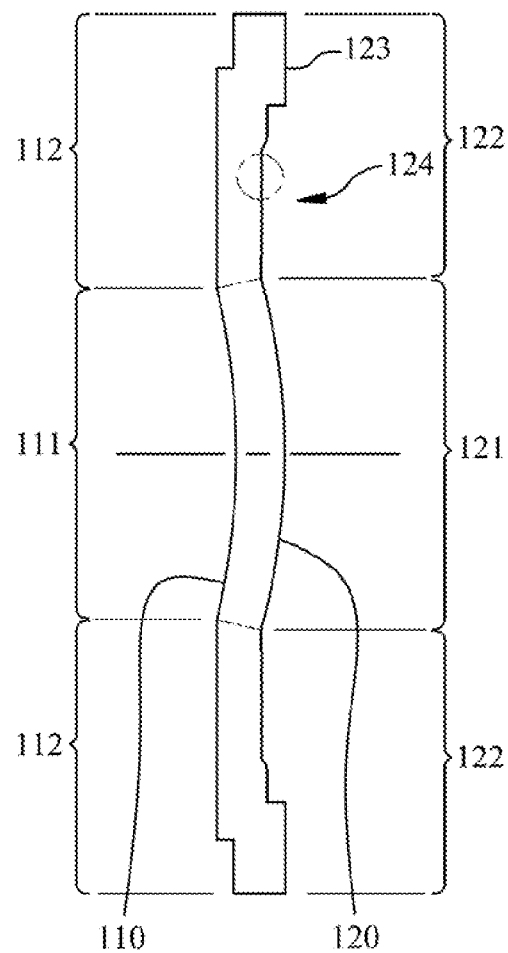
FIG. 2A is a schematic view of a plastic lens according to 1st example of the present disclosure.
Figure 2B:
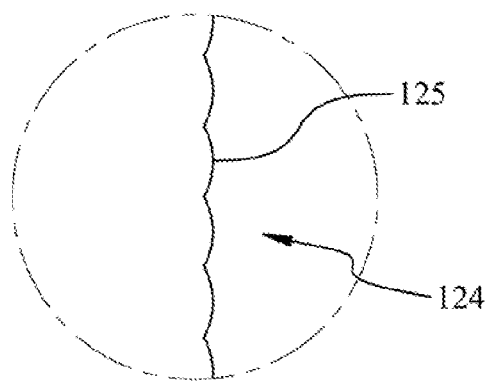
FIG. 2B is a partially enlarged view of a rugged region of the plastic lens shown in FIG. 2A.

FIG. 2A is a schematic view of a plastic lens 100 according to 1st example of the present disclosure. FIG. 2B is a partially enlarged view of a rugged region 124 of the plastic lens 100 shown in FIG. 2A. In FIG. 2A, the plastic lens 100 includes a first surface 110 and a second surface 120. The first surface 110 is concave and the second surface 120 is convex. The second surface 120 is opposite to the first surface 110. The first surface 110 includes an optically effective portion 111 and an outer portion 112, and the outer portion 112 surrounds the optically effective portion 111. The second surface 120 includes an optically effective portion 121 and an outer portion 122, and the outer portion 122 surrounds the optically effective portion 121. The outer portion 122 includes the rugged region 124 and an abutting region 123. The abutting region 123 is disposed farther from a center of the plastic lens 100 than the rugged region 124. The abutting region 123 is an engaging structure. As shown in FIG. 2B, the rugged region 124 has a plurality of arc-shaped protrusions 125 thereon. Furthermore, the protrusions 125 are annular, and the protrusions 125 are disposed concentrically around the center of the plastic lens 100.

An outermost diameter of the plastic lens 100 is Dmax. A central thickness of the plastic lens 100 is CT. A radial length of the rugged region 124 is L. A minimum distance between the first surface 110 at the outer portion 112 and the second surface 120 at the outer portion 122 is d. A curvature radius of the protrusion 125 is R.

The values of Dmax, CT, L, d and R of the 1st example are shown in Table 1.

TABLE 1

1st example (unit: mm)

| Dmax | CT | L | d | R |
|---|---|---|---|---|
| 6.000 | 0.330 | 0.720 | 0.300 | 0.060 |

The values of CT/Dmax, L/CT, L/d, R/L and d/CT are calculated from Table 1 and are shown in Table 2.

TABLE 2

| CT/Dmax | L/CT | L/d | R/L | d/CT |
|---|---|---|---|---|
| 0.055 | 2.182 | 2.400 | 0.083 | 0.909 |

2nd Example

Figure 3A:
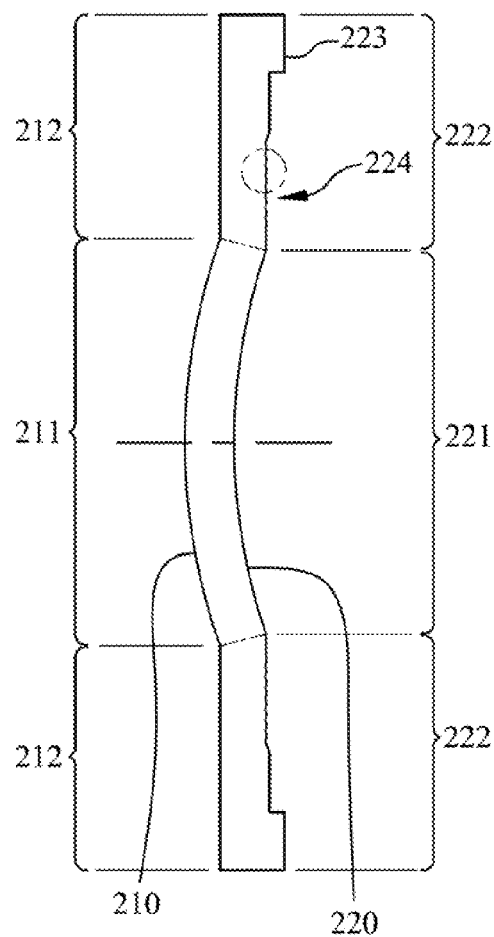
FIG. 3A is a schematic view of a plastic lens according to 2nd example of the present disclosure.
Figure 3B:
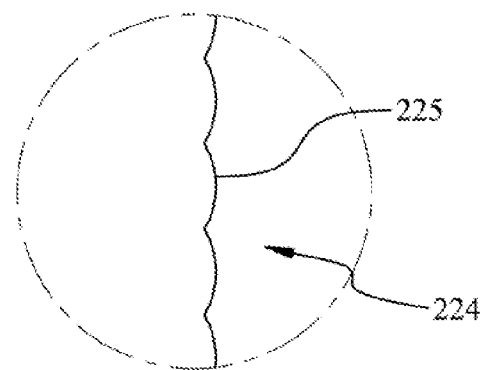
FIG. 3B is a partially enlarged view of a rugged region of the plastic lens shown in FIG. 3A.

FIG. 3A is a schematic view of a plastic lens 200 according to 2nd example of the present disclosure. FIG. 3B is a partially enlarged view of a rugged region 224 of the plastic lens 200 shown in FIG. 3A. In FIG. 3A, the plastic lens 200 includes a first surface 210 and a second surface 220. The first surface 210 is convex, and the second surface 220 is concave. The second surface 220 is opposite to the first surface 210. The first surface 210 includes an optically effective portion 211 and an outer portion 212, and the outer portion 212 surrounds the optically effective portion 211. The second surface 220 includes an optically effective portion 221 and an outer portion 222, and the outer portion 222 surrounds the optically effective portion 221. The outer portion 222 includes the rugged region 224 and an abutting region 223. The abutting region 223 is disposed farther from a center of the plastic lens 200 than the rugged region 224. The abutting region 223 is an engaging structure. As shown in FIG. 3B, the rugged region 224 has a plurality of arc-shaped protrusions 225 thereon. Furthermore, the protrusions 225 are annular, and the protrusions 225 are disposed concentrically around the center of the plastic lens 200.

An outermost diameter of the plastic lens 200 is Dmax. A central thickness of the plastic lens 200 is CT. A radial length of the rugged region 224 is L. A minimum distance between the first surface 210 at the outer portion 212 and the second surface 220 at the outer portion 222 is d. A curvature radius of the protrusion 225 is R.

The values of Dmax, CT, L, d and R of the 2nd example are shown in Table 3.

TABLE 3

2nd example (unit: mm)

| Dmax | CT | L | d | R |
|---|---|---|---|---|
| 4.360 | 0.250 | 0.420 | 0.230 | 0.050 |

The values of CT/Dmax, L/CT, L/d, R/L and d/CT are calculated from Table 3 and are shown in Table 4.

TABLE 4

| CT/Dmax | L/CT | L/d | R/L | d/CT |
|---|---|---|---|---|
| 0.057 | 1.680 | 1.826 | 0.119 | 0.920 |

3rd Example

Figure 4A:
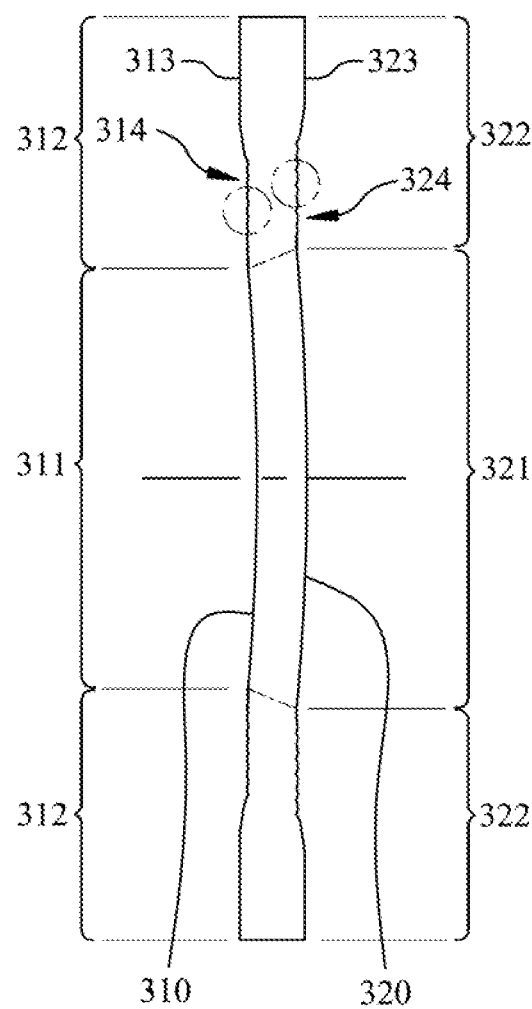
FIG. 4A is a schematic view of a plastic lens according to 3rd example of the present disclosure.
Figure 4B:
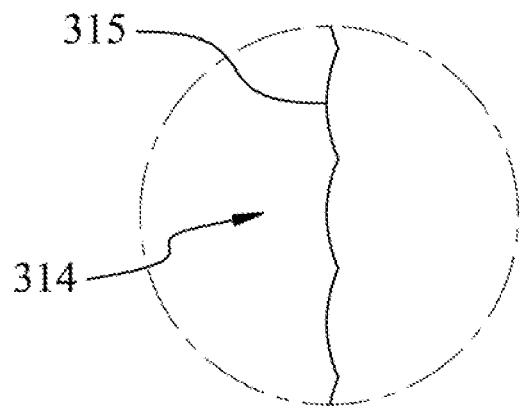
FIG. 4B is a partially enlarged view of a rugged region of the plastic lens shown in FIG. 4A.
Figure 4C:
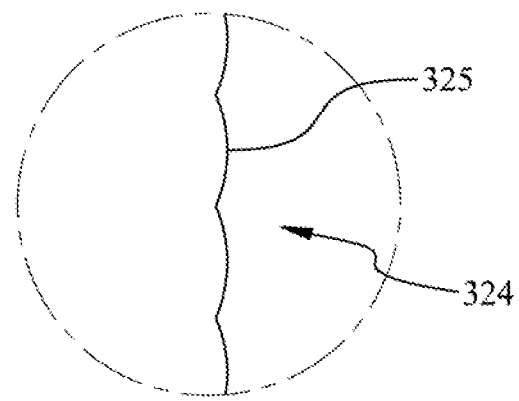
FIG. 4C is a partially enlarged view of another rugged region of the plastic lens shown in FIG. 4A.

FIG. 4A is a schematic view of a plastic lens 300 according to 3rd example of the present disclosure. FIG. 4B is a partially enlarged view of a rugged region 314 of the plastic lens 300 shown in FIG. 4A. FIG. 4C is a partially enlarged view of another rugged region 324 of the plastic lens 300 shown in FIG. 4k In FIG. 4A, the plastic lens 300 includes a first surface 310 and a second surface 320. The first surface 310 is concave, and the second surface 320 is convex. The second surface 320 is opposite to the first surface 310. The first surface 310 includes an optically effective portion 311 and an outer portion 312, and the outer portion 312 surrounds the optically effective portion 311. The outer portion 312 includes the rugged region 314 and an abutting region 313. The abutting region 313 is disposed farther from a center of the plastic lens 300 than the rugged region 314. As shown in FIG. 4B, the rugged region 314 has a plurality of arc-shaped protrusions 315 thereon. Furthermore, the protrusions 315 are annular, and the protrusions 315 are disposed concentrically around the center of the plastic lens 300. The second surface 320 includes an optically effective portion 321 and an outer portion 322, and the outer portion 322 surrounds the optically effective portion 321. The outer portion 322 includes the rugged region 324 and an abutting region 323. The abutting region 323 is disposed farther from the center of the plastic lens 300 than the rugged region 324. As shown in FIG. 4C, the rugged region 324 has a plurality of arc-shaped protrusions 325 thereon. Furthermore, the protrusions 325 are annular, and the protrusions 325 are disposed concentrically around the center of the plastic lens 300.

An outermost diameter of the plastic lens 300 is Dmax. A central thickness of the plastic lens 300 is CT. A minimum distance between the first surface 310 at the outer portion 312 and the second surface 320 at the outer portion 322 is d. A radial length of the rugged region 314 is L1. A curvature radius of the protrusion 315 is R1. A radial length of the rugged region 324 is L2. A curvature radius of the protrusion 325 is R2.

The values of Dmax, CT, d, L1, R1, L2 and R2 of the 3rd example are shown in Table 5.

TABLE 5

3rd example (unit: mm)

| Dmax | CT | d | L1 | R1 | L2 | R2 |
|---|---|---|---|---|---|---|
| 5.000 | 0.270 | 0.260 | 0.520 | 0.090 | 0.520 | 0.090 |

The values of CT/Dmax, L1/CT, L1/d, R1/L1, L2/CT, L2/d, R2/L2 and d/CT are calculated from Table 5 and are shown in Table 6.

TABLE 6

| CT/Dmax | L1/CT | L1/d | R1/L1 |
|---|---|---|---|
| 0.054 | 1.926 | 2.000 | 0.173 |
| L2/CT | L2/d | R2/L2 | d/CT |
| 1.926 | 2.000 | 0.173 | 0.963 |

4th Example

Figure 5A:
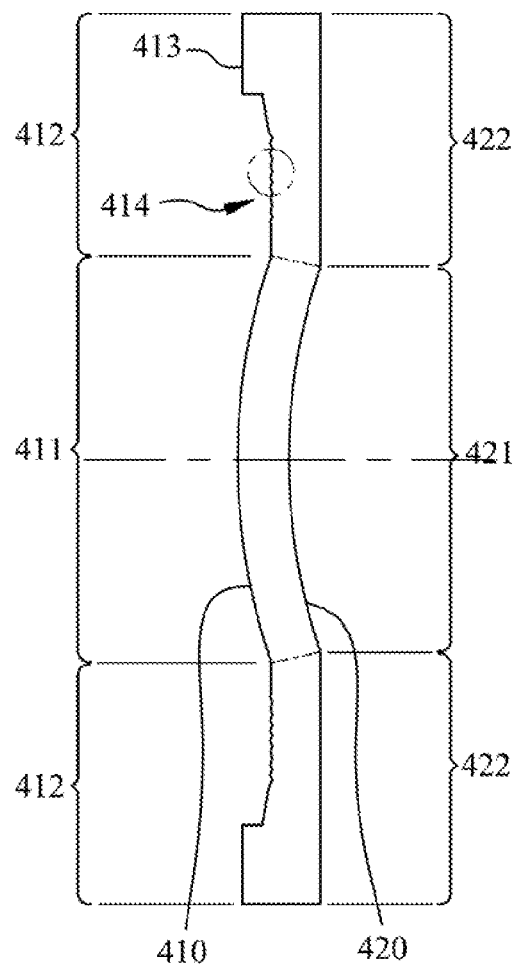
FIG. 5A is a schematic view of a plastic lens according to 4th example of the present disclosure.
Figure 5B:
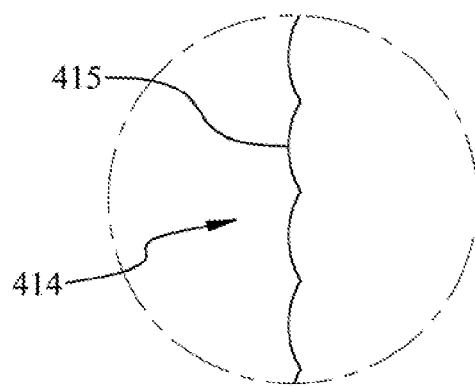
FIG. 5B is a partially enlarged view of a rugged region of the plastic lens shown in FIG. 5A.

FIG. 5A is a schematic view of a plastic lens 400 according to 4th example of the present disclosure. FIG. 5B is a partially enlarged view of a rugged region 414 of the plastic lens 400 shown in FIG. 5A. In FIG. 5A, the plastic lens 400 includes a first surface 410 and a second surface 420. The first surface 410 is convex, and the second surface 420 is concave. The second surface 420 is opposite to the first surface 410. The first surface 410 includes an optically effective portion 411 and an outer portion 412, and the outer portion 412 surrounds the optically effective portion 411. The outer portion 412 includes the rugged region 414 and an abutting region 413. The abutting region 413 is disposed farther from a center of the plastic lens 400 than the rugged region 414. As shown in FIG. 5B, the rugged region 414 has a plurality of arc-shaped protrusions 415 thereon. Furthermore, the protrusions 415 are annular, and the protrusions 415 are disposed concentrically around the center of the plastic lens 400. The second surface 420 includes an optically effective portion 421 and an outer portion 422, and the outer portion 422 surrounds the optically effective portion 421.

An outermost diameter of the plastic lens 400 is Dmax. A central thickness of the plastic lens 400 is CT. A radial length of the rugged region 414 is L. A minimum distance between the first surface 410 at the outer portion 412 and the second surface 420 at the outer portion 422 is d. A curvature radius of the protrusion 415 is R.

The values of Dmax, CT, L, d and R of the 4th example are shown in Table 7.

TABLE 7

| 4th example (units: mm) | | | | |
| --- | --- | --- | --- | --- |
| Dmax | CT | L | d | R |
| 4.350 | 0.250 | 0.420 | 0.240 | 0.050 |

The values of CT/Dmax, L/CT, L/d, R/L and d/CT are calculated from Table 7 and are shown in Table 8.

TABLE 8

| CT/Dmax | L/CT | L/d | R/L | d/CT |
| --- | --- | --- | --- | --- |
| 0.057 | 1.680 | 1.750 | 0.119 | 0.960 |

5th Example

Figure 6A:
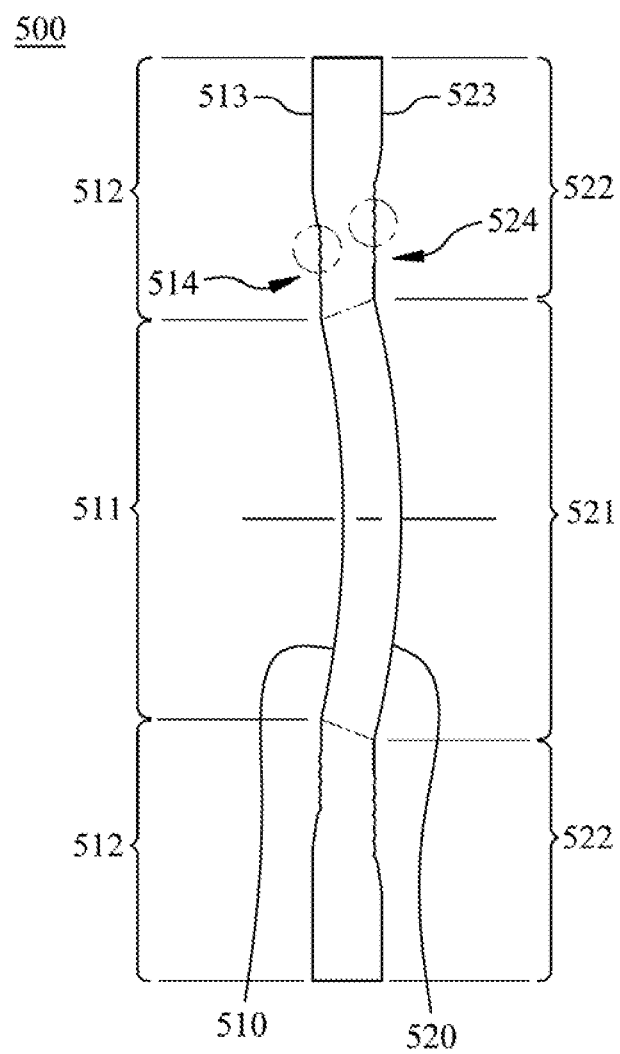
FIG. 6A is a schematic view of a plastic lens according to 5th example of the present disclosure.
Figure 6B:
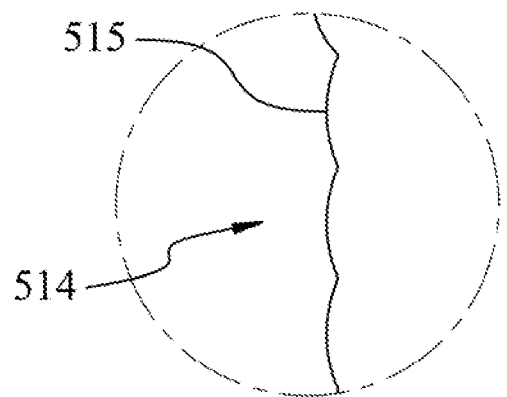
FIG. 6B is a partially enlarged view of a rugged region of the plastic lens shown in FIG. 6A.
Figure 6C:
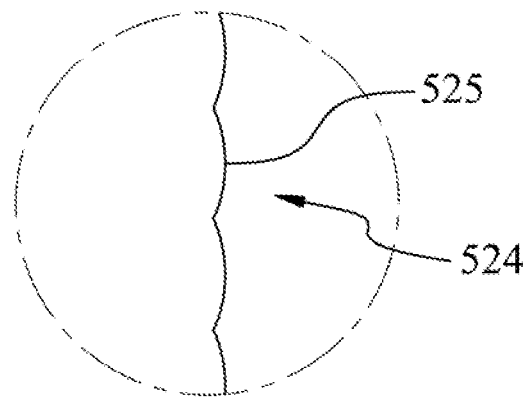
FIG. 6C is a partially enlarged view of another rugged region of the plastic lens shown in FIG. 6A.

FIG. 6A is a schematic view of a plastic lens 500 according to 5th example of the present disclosure. FIG. 6B is a partially enlarged view of a rugged region 514 of the plastic lens 500 shown in FIG. 6A. FIG. 6C is a partially enlarged view of another rugged region 524 of the plastic lens 500 shown in FIG. 6A. In FIG. 6A, the plastic lens 500 includes a first surface 510 and a second surface 520. The first surface 510 is concave, and the second surface 520 is convex. The second surface 520 is opposite to the first surface 510. The first surface 510 includes an optically effective portion 511 and an outer portion 512, and the outer portion 512 surrounds the optically effective portion 511. The outer portion 512 includes the rugged region 514 and an abutting region 513. The abutting region 513 is disposed farther from a center of the plastic lens 500 than the rugged region 514. As shown in FIG. 6B, the rugged region 514 has a plurality of arc-shaped protrusions 515 thereon. Furthermore, the protrusions 515 are annular, and the protrusions 515 are disposed concentrically around the center of the plastic lens 500. The second surface 520 includes an optically effective portion 521 and an outer portion 522, and the outer portion 522 surrounds the optically effective portion 521. The outer portion 522 includes the rugged region 524 and an abutting region 523. The abutting region 523 is disposed farther from the center of the plastic lens 500 than the rugged region 524. As shown in FIG. 6C, the rugged region 524 has a plurality of arc-shaped protrusions 525 thereon. Furthermore, the protrusions 525 are annular, and the protrusions 525 are disposed concentrically around the center of the plastic lens 500.

An outermost diameter of the plastic lens 500 is Dmax. A central thickness of the plastic lens 500 is CT. A minimum distance between the first surface 510 at the outer portion 512 and the second surface 520 at the outer portion 522 is d. A radial length of the rugged region 514 is L1. A curvature radius of the protrusion 515 is R1. A radial length of the rugged region 524 is L2. A curvature radius of the protrusion 525 is R2.

The values of Dmax, CT, d, L1, R1, L2 and R2 of the 5th example are shown in Table 9.

TABLE 9

| 5th example (unit: mm) | | | | | | |
| --- | --- | --- | --- | --- | --- | --- |
| Dmax | CT | d | L1 | R1 | L2 | R2 |
| 4.780 | 0.300 | 0.270 | 0.290 | 0.090 | 0.430 | 0.090 |

The values of CT/Dmax, L1/CT, L1/d, R1/L1, L2/CT, L2/d, R2/L2 and d/CT are calculated from Table 9 and are shown in Table 10.

TABLE 10

| CT/Dmax | L1/CT | L1/d | R1/L1 |
| --- | --- | --- | --- |
| 0.063 | 0.967 | 1.074 | 0.310 |
| L2/CT | L2/d | R2/L2 | d/CT |
| 1.433 | 1.593 | 0.209 | 0.900 |

6th Example

Figure 7A:
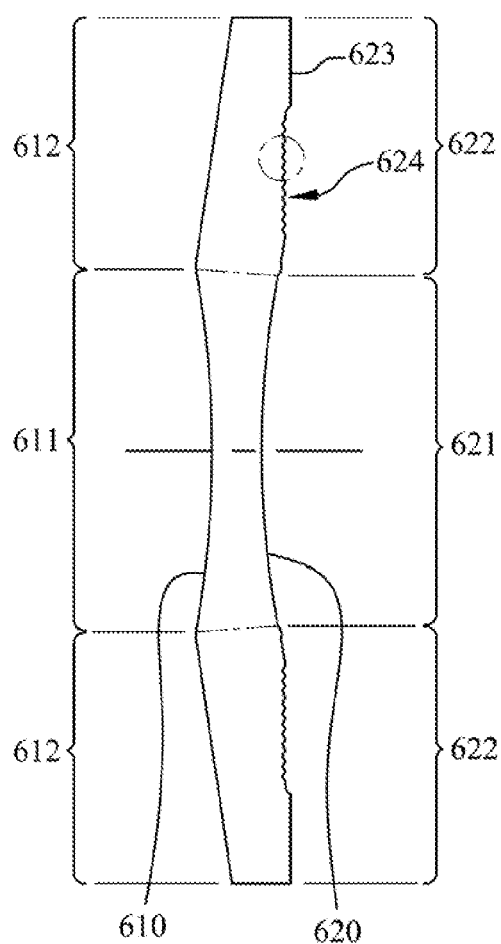
FIG. 7A is a schematic view of a plastic lens according to 6th example of the present disclosure.
Figure 7B:
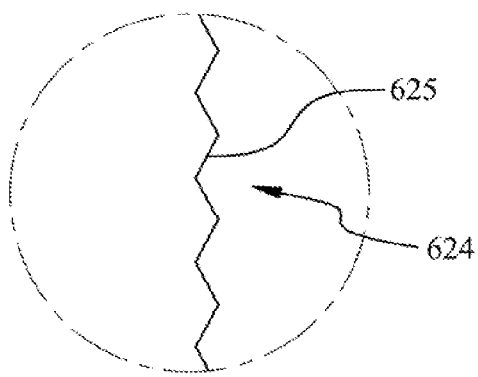
FIG. 7B is a partially enlarged view of a rugged region of the plastic lens shown in FIG. 7A.

FIG. 7A is a schematic view of a plastic lens 600 according to 6th example of the present disclosure. FIG. 7B is a partially enlarged view of a rugged region 624 of the plastic lens 600 shown in FIG. 7A. In FIG. 7A, the plastic lens 600 includes a first surface 610 and a second surface 620. The first surface 610 and the second surface 620 are concave. The second surface 620 is opposite to the first surface 610. The first surface 610 includes an optically effective portion 611 and an outer portion 612, and the outer portion 612 surrounds the optically effective portion 611. The second surface 620 includes an optically effective portion 621 and an outer portion 622, and the outer portion 622 surrounds the optically effective portion 621. The outer portion 622 includes the rugged region 624 and an abutting region 623. The abutting region 623 is disposed farther from a center of the plastic lens 600 than the rugged region 624. As shown in FIG. 7B, the rugged region 624 has a plurality of triangular protrusions 625 thereon. Furthermore, the protrusions 625 are annular, and the protrusions 625 are disposed concentrically around the center of the plastic lens 600.

An outermost diameter of the plastic lens 600 is Dmax. A central thickness of the plastic lens 600 is CT. A radial length of the rugged region 624 is L. A minimum distance between the first surface 610 at the outer portion 612 and the second surface 620 at the outer portion 622 is d.

The values of Dmax, CT, L and d of the 6th example are shown in Table 11.

TABLE 11

| 6th example (unit: mm) | | | |
|---|---|---|---|
| Dmax | CT | L | d |
| 4.190 | 0.240 | 0.560 | 0.320 |

The values of CT/Dmax, L/CT, L/d and d/CT are calculated from Table 11 and are shown in Table 12.

TABLE 12

| CT/Dmax | L/CT | L/d | d/CT |
|---|---|---|---|
| 0.057 | 2.333 | 1.750 | 1.333 |

7th Example

Figure 8A:
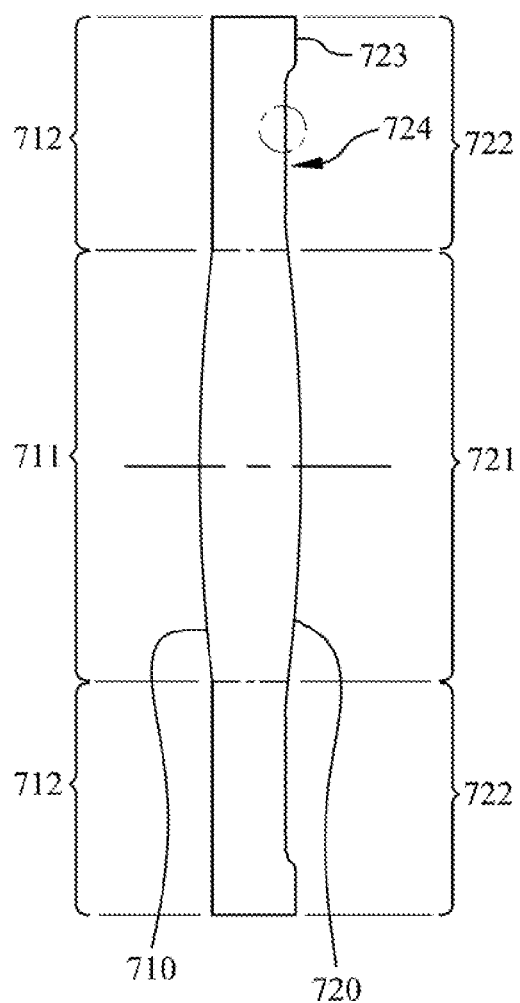
FIG. 8A is a schematic view of a plastic lens according to 7th example of the present disclosure.
Figure 8B:
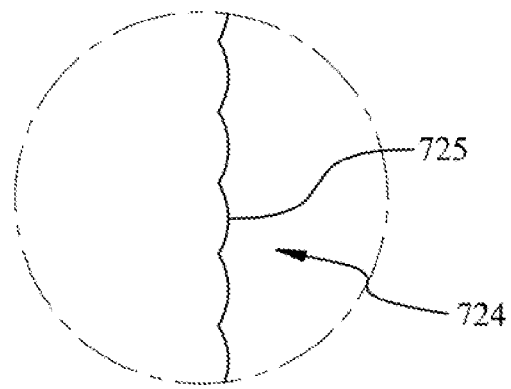
FIG. 8B is a partially enlarged view of a rugged region of the plastic lens shown in FIG. 8A.

FIG. 8A is a schematic view of a plastic lens 700 according to 7th example of the present disclosure. FIG. 8B is a partially enlarged view of a rugged region 724 of the plastic lens 700 shown in FIG. 8A. In FIG. 8A, the plastic lens 700 includes a first surface 710 and a second surface 720. The first surface 710 is convex, and the second surface 720 is convex. The second surface 720 is opposite to the first surface 710. The first surface 710 includes an optically effective portion 711 and an outer portion 712, and the outer portion 712 surrounds the optically effective portion 711. The second surface 720 includes an optically effective portion 721 and an outer portion 722, and the outer portion 722 surrounds the optically effective portion 721. The outer portion 722 includes the rugged region 724 and an abutting region 723. The abutting region 723 is disposed farther from a center of the plastic lens 700 than the rugged region 724. As shown in FIG. 8B, the rugged region 724 has a plurality of arc-shaped protrusions 725 thereon. Furthermore, the protrusions 725 are annular, and the protrusions 725 are disposed concentrically around the center of the plastic lens 700.

An outermost diameter of the plastic lens 700 is Dmax. A central thickness of the plastic lens 700 is CT. A radial length of the rugged region 724 is L. A minimum distance between the first surface 710 at the outer portion 712 and the second surface 720 at the outer portion 722 is d. A curvature radius of the protrusion 725 is R.

The values of Dmax, CT, L, d and R of the 7th example are shown in Table 13

TABLE 13

| 7th example (unit: mm) | | | | |
|---|---|---|---|---|
| Dmax | CT | L | d | R |
| 4.410 | 0.490 | 0.650 | 0.240 | 0.040 |

The values of CT/Dmax, L/CT, L/d, R/L and d/CT are calculated from Table 13 and are shown in Table 14,

TABLE 14

| CT/Dmax | L/CT | L/d | R/L | d/CT |
|---|---|---|---|---|
| 0.111 | 1.327 | 2.708 | 0.062 | 0.490 |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A plastic lens, comprising:
   a first surface; and
   a second surface opposite to the first surface;
   wherein at least one of the first surface and the second surface comprises:
      an optically effective portion; and
      an outer portion surrounding the optically effective portion, wherein the outer portion comprises:
         a rugged region having a plurality of protrusions thereon; and
         an abutting region disposed farther from a center of the plastic lens than the rugged region;
   wherein a central thickness of the plastic lens CT, an outermost is diameter of the plastic lens is Dmax, and the following relationships are satisfied:

$CT/D\max < 0.2$; and $D\max < 8$ mm.

2. The plastic lens of claim 1, wherein the central thickness of the plastic lens is CT, and the following relationship is satisfied:

$CT < 0.35$ mm.

3. The plastic lens of claim 2, wherein a radial length of the rugged region is L, the central thickness of the plastic lens is CT, and the following relationship is satisfied:

$0.5 < L/CT < 4.0$.

4. The plastic lens of claim 3, wherein the radial length of the rugged region is L, the central thickness of the plastic lens is CT, and the following relationship is satisfied:

$1.3 < L/CT < 2.3$.

5. The plastic lens of claim 3, wherein the abutting region is an engaging structure.

6. The plastic lens of claim 3, wherein minimum distance between the first surface and the second surface at the outer portion is d, the central thickness of the plastic lens is CT, and the following relationship is satisfied:

$d/CT < 1.0$.

7. The plastic lens of claim 3, wherein the radial length of the rugged region is L, a minimum distance between the first surface and the second surface at the outer portion is d, and the following relationship is satisfied:

$0.7 < L/d < 4.0$.

8. The plastic lens of claim 3, wherein the central thickness of the plastic is CT, and the following relationship is satisfied:

$CT < 0.27$ mm.

9. The plastic lens of claim 3, wherein one of the first surface and the second surface is concave, and the other is convex.

10. The plastic lens of claim 3, wherein each of the protrusions is arc-shaped, a curvature radius of the protrusion is R, and the following relationship is satisfied:

0.01 mm<$R$<0.21 mm.

11. The plastic lens of claim 10, wherein the curvature radius of the protrusion is R, and the following relationship is satisfied:

0.03 mm<$R$<0.1 mm.

12. The plastic lens of claim 10, wherein the curvature radius of the protrusion is R, the radial length of the rugged region is L, and the following relationship is satisfied:

0.03<$R/L$<0.3.

13. The plastic lens of claim 3, wherein the protrusions are annular, and the protrusions are disposed concentrically around the center of the plastic lens.

14. A plastic lens, comprising:
a first surface; and
a second surface opposite to the first surface;
wherein at least one of the first surface and the second surface comprise:
an optically effective portion; and
an outer portion surrounding the optically effective portion, wherein the outer portion comprises:
a rugged region having a plurality of protrusions thereon; and
an abutting region disposed farther from a center of the plastic lens than the rugged region;
wherein a radial length of the rugged region is L, a central thickness of the plastic lens is CT, an outermost diameter of the plastic lens is Dmax, and the following relationships are satisfied:

0.5<$L$/CT<4.0; and $D$max<8 mm.

15. The plastic lens of claim 14, wherein the radial length of the rugged region is L, the central thickness of the plastic lens is CT, and the following relationship is satisfied:

1.3<$L$/CT<2.3.

16. The plastic lens of claim 14, wherein each of the protrusions is arc-shaped, a curvature radius of the protrusion is R, and the following relationship is satisfied:

0.01 mm<$R$<0.21 mm.

17. The plastic lens of claim 16, wherein the curvature radius of the protrusion is R, and the following relationship is satisfied:

0.03 mm<$R$<0.1 mm.

18. The plastic lens of claim 14, wherein the radial length of the rugged region is L, a minimum distance between the first surface and the second surface at the outer portion is d, and the following relationship is satisfied:

0.7<$L/d$<4.0.

19. The plastic lens of claim 14, wherein each of the protrusions is arc-shaped, a curvature radius of the protrusion is R, the radial length of the rugged region is L, and the following relationship is satisfied:

0.03<$R/L$<0.3.

20. The plastic lens of claim 14, wherein the central thickness of the plastic lens is CT, and the following relationship is satisfied:

CT<0.27 mm.

21. The plastic lens of claim 14, wherein a minimum distance between the first surface and the second surface at the outer portion is d, the central thickness of the plastic lens CT, and the following relationship is satisfied:

$d$/CT<1.0.

22. The plastic lens of claim 14, wherein the protrusions are annular, and the protrusions are disposed concentrically around the enter of the plastic lens.

* * * * *